N. C. HILL AND H. L. MOYLER.
MANUFACTURE OF NITRIC ACID.
APPLICATION FILED APR. 28, 1920.
1,362,418.
Patented Dec. 14, 1920.
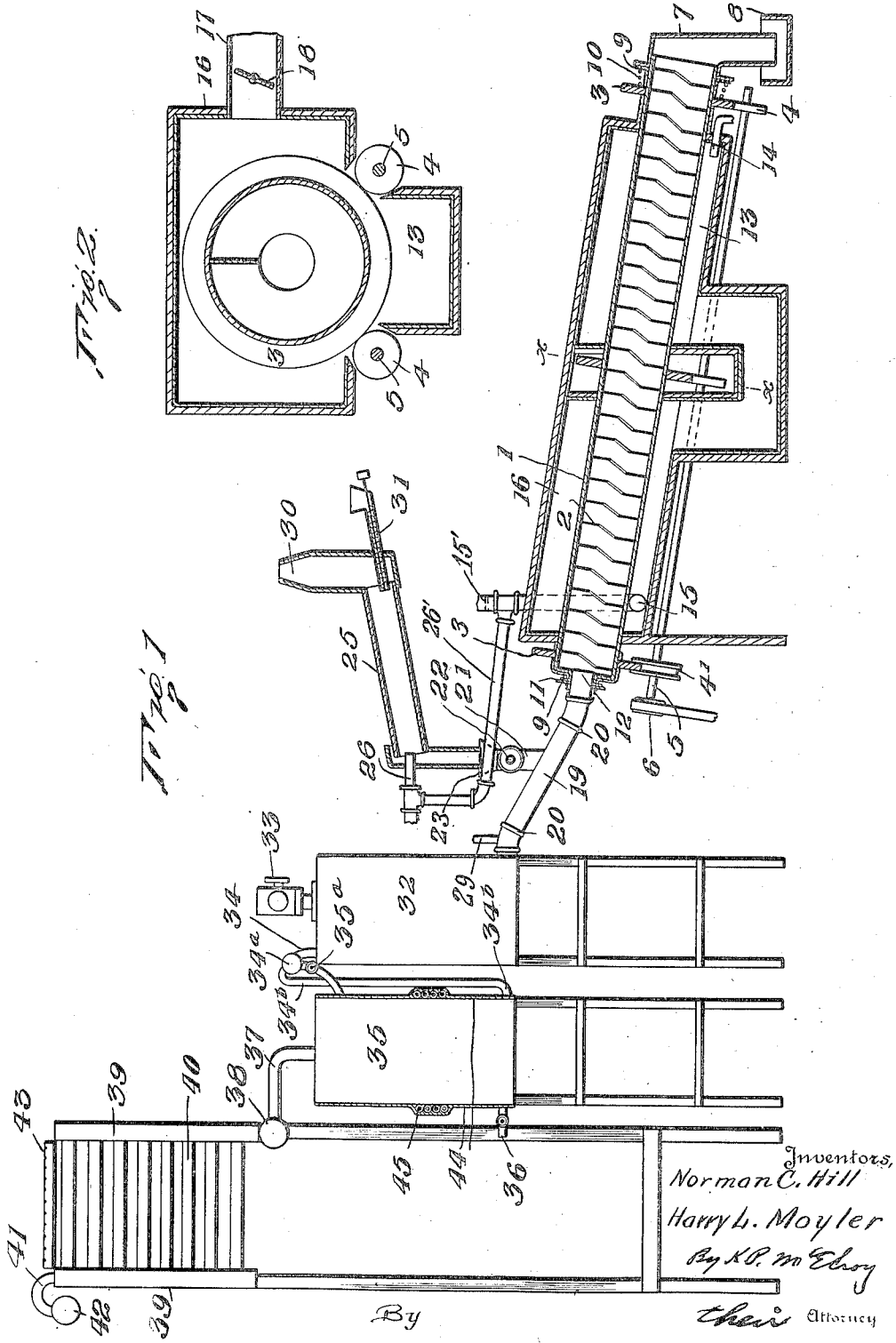

UNITED STATES PATENT OFFICE.

NORMAN C. HILL, OF FREEPORT, PENNSYLVANIA, AND HARRY L. MOYLER, OF PETERSBURG, VIRGINIA.

MANUFACTURE OF NITRIC ACID.

1,362,418.   Specification of Letters Patent.   Patented Dec. 14, 1920.

Application filed April 28, 1920. Serial No. 377,369.

*To all whom it may concern:*

Be it known that we, NORMAN C. HILL and HARRY L. MOYLER, citizens of the United States, NORMAN C. HILL being a resident of Freeport, in the county of Armstrong and State of Pennsylvania, and HARRY L. MOYLER being a resident of Petersburg, in the county of Dinwiddie and State of Virginia, have invented certain new and useful Improvements in the Manufacture of Nitric Acid, of which the following is a specification.

This invention relates to the manufacture of nitric acid; and it comprises a method for continuous production of nitric acid wherein a moving body of sulfuric acid merging into fused alkali metal sulfate is established and maintained and granular or pulverulent sodium nitrate is supplied at a mid-point in the movement of the body of acid, said nitrate flowing forward with the sulfuric acid and the nitric acid vapors evolved therefrom passing in countercurrent to the stream of sulfuric acid for subsequent condensation and collection; and it furthermore comprises as a new organization of apparatus elements useful in the production of nitric acid and other volatile acids, a rotatable drum having a helical conveyer rib therein, regulable means for heating said drum, means for removing fused products of reaction at one end of the drum, means for supplying a flowing current of heated sulfuric acid at the other end of the drum, means for feeding a saline material into said stream, means for passing evolved acid vapors in countercurrent to the stream of sulfuric acid and means for condensing and collecting said volatile acids; all as more fully hereinafter set forth and as claimed.

The methods of manufacturing nitric acid from Chile saltpeter (sodium nitrate) and sulfuric acid now in use are essentially intermittent and give acids of varying strengths at different stages of the operation. For the most part, nitric acid is made by charging a pot still with nitrate and sulfuric acid and heating until reaction is complete, giving a distillate of nitric acid and a fused residue of sulfates. With sodium nitrate this residue or "niter cake" usually approximates the composition of sodium acid sulfate ($NaHSO_4$). However, in practice the amount of acid remaining is extremely variable; it may contain more sulfuric acid than corresponds to this formula or less. Being essentially a distillation process, the character of the condensate varies from time to time during the distillation; or, in other words, acids of different strengths are produced at different stages. The operation is carried out in iron pot stills and these are not of long life, being of heavy metal and being exposed to extreme variations in temperature during the operation. At the beginning of the distillation the temperature is low, while at the end it may approach a red heat.

In the present invention we have devised a method of, and means for, making nitric acid continuously and on a large scale, the acid being produced in vaporized form and the vapors passing through a succession of collecting devices, each such device delivering a flow of condensed nitric acid of constant strength. To accomplish this we establish and maintain a progressive flow of hot sulfuric acid through a suitable conduit and into and through a suitable retort suitably heated; and to the flow of sulfuric acid in said conduit we continuously add small portions of dry nitrate, either sodium nitrate or potassium nitrate as the case may be. It is best to preheat this nitrate to some extent prior to the addition; and it may be heated sufficiently to deliver it in a molten state. If solid, it should be granular. The conduit in which this addition of nitrate to the flowing current of acid takes place should be of ample cross section to give plenty of room for vapors. Under these conditions each grain (or drop) of nitrate as it falls into the hot sulfuric acid, begins to evolve vapors of nitric acid; strong nitric acid being of course freely volatile at all temperatures above its boiling point (86° C.). Each granule or drop is surrounded and cushioned by evolved nitric acid vapors, these vapors keeping the granules apart and preventing any clumping or clogging. Operating in this manner, it becomes easy to obtain a controlled, constant, proportioned mixture and forward feed of nitrate and sulfuric acid. As the granules pass forward with the acid, conversion into sulfate progressively goes forward and finally the granules pass into, or are dissolved by, and merged with the flow of acid and sulfate. The flow of sulfuric acid becomes converted, by insensible degrees, into a flow of molten sulfates which are delivered at the other end of the apparatus in a fused state. In practice we provide a roomy tubular conduit of acid resistant material (duriron, silicious cast iron, silicon, quartz, etc.); pass a current of warm or hot sulfuric acid into one end, and allow fused or granulated dry nitrate to drop into the conduit toward the acid at a mid point in the length of the conduit. At the other end, the conduit enters a roomy rotating retort or cylinder set at an incline and provided with a helical internal rib or flange capable of regulating the forward flow of the mixed materials. Within this retort the reactions initiated in the conduit are completed. Below this retort we provide a fire chamber, fired in any suitable manner and having exit means for products of combustion, while above and around the retort we provide a hot chamber, drawing more or less products of combustion from below and provided with suitable damper-controlled exit means for gases.

Fused residual sulfates are delivered at the lower end of the cylinder into suitable trapping means. At the upper end of the cylinder nitric acid vapors pass outward into and through the stated conduit in countercurrent to flowing sulfuric acid therein. Beyond the conduit the vapors are delivered into a scrubbing tower where they pass in countercurrent to downward flowing sulfuric acid, usually, and advantageously, containing more or less nitric acid. In this counter current contact the upward passing nitric acid vapors are stripped, to some extent, of nitrous vapors, and are freed of much or most of the water vapor. Such nitric acid as may be in the sulfuric acid used for the contact vaporizes and joins the nitric acid vapors from the retort. The sulfuric acid coming from the base of the scrubbing tower and heated by the nitric acid vapors is delivered into the conduit to furnish the flowing current of sulfuric acid therein. Beyond this scrubbing tower, the nitric acid vapors, together with more or less unabsorbed nitrous vapors, pass into a bleaching tower where they meet a countercurrent of condensed nitric acid from a suitable source. This condensed nitric acid is bleached in this tower. At the base of the tower a strong nitric acid of, usually, at least 98 per cent. $HNO_3$ is delivered. Uncondensed nitric acid and nitrous vapors pass to the stated condenser wherein nitric acid is condensed and returned to the bleaching tower, while uncondensed nitrous oxids pass to any suitable arrangement of oxidizing and absorbing towers (not shown) for conversion into nitric acid. Nitric acid of, say, 68 to 75 per cent. strength from these oxidizing and absorbing towers may be admixed with sufficient strong sulfuric acid to give a mixture of 85 to 95 per cent. $H_2SO_4$ and returned for use in the scrubbing towers. Prior to sending to the scrubbing towers, the mixture may be heated. A very good mixed acid which we have used for this purpose in the scrubbing towers contained, on analysis, 91.38 per cent. $H_2SO_4$, 6.18 per cent. $HNO_3$, 0.44 per cent. $N_2O_4$ and 2 per cent. water. Ordinarily, 8 to 12 per cent. of the total acid, calculated on the amount of nitrate used, goes beyond the condenser to the oxidation and absorption arrangement and is recovered as 68 to 75 per cent. nitric acid. This recovered acid may be, as stated, admixed with sulfuric acid and go back into the system.

In the accompanying illustration, we have shown, more or less diagrammatically, certain embodiments of apparatus elements within the described invention and susceptible of use in the performance of the described process. In this showing—

Figure 1 is a central vertical section with certain parts in elevation of a complete apparatus under the present invention, while Fig. 2 is a detailed view in cross section along line $x$—$x$ of the retort and heating arrangements of Fig. 1.

In the showing, element 1 represents as a whole a long rotating retort or drum of acid resistant iron or the like. This retort is set at a slight inclination (exaggerated in the showing), to promote forward feed of materials therethrough. It is internally provided with a helical rib or conveyer 2 rigid therewith. It is provided with an ordinary type of riding ring 3 resting on paired rollers 4. The rollers 4', are flanged, while the others are smooth to allow longitudinal movement of the retort in expansion and contraction. The rollers are driven by shaft 5 and pulley 6. At its lower end the rotary retort communicates with stationary housing or hood 7 having a seal pot 8 below it to receive fused sulfates. The housing and the end of the retort are provided with flat flanged extensions 9 to exclude air as much as possible. The whole apparatus is operated under slight suction and such leakage as there may be between the flanges will be of air inward. Entrance of a little air does no harm and, on the other hand, aids in reoxidizing nitrous vapors. The flanges on the housing may be spring pressed, using springs 10. At the other end of the retort is a similar flanged closure 11 through which passes acid and nitrate feed inlet 12. The retort as a whole is heated by fire chamber 13 set below it and having a top opening approximately closed (see Fig. 2) by the lowermost quadrant of the cylindrical retort. As shown, the fire chamber is heated by burner 14 supplied with oil or gas. Products of combustion are removed at waste gas outlet 15 dampered at 15'. The upper part of the retort, as shown, is surrounded by a hot chamber 16, provided with a waste gas outlet 17 dampered at 18. By appropriately regulating damper 18, more or less of the hot gases from the fire chamber pass upward around the retort and into the hot chamber.

Returning to the feed end of the retort, the stationary feed inlet (12) is continued as conduit 19 set at an incline and composed of any suitable acid resistant material, such as the various acid resistant irons, quartz, etc. It may be composed of several sections of tubing united by bell joints 20. Passing into this conduit at a mid-point is nitrate inlet conduit 21 supplied with preheated granular or molten nitrate by suitable feeding means 22, such as an ordinary star feed valve. Nitrate is contained in hopper 23 to which it may be delivered from any suitable drying and heating apparatus. As shown it falls into the hopper from a vertical conduit communicating with the lower end of a rotary drier 25. In this drier nitrate may be dried and heated or fused in any suitable manner. Drying may be by flame heat or by the use of hot gases, such as hot products of combustion. Inlet 26 may introduce fire gases or products of combustion. Hot products of combustion from the fire chamber around the retort may be used for drying and heating in this drier, these products coming through dampered conduit 26'. Nitrate is supplied to the drier by feed means 31. Waste gases may be removed from the drier by stack means 30.

In using the apparatus just described, hot dry granular or fused nitrate coming from the drier is supplied to the acid conduit (19) where it drops toward the surface of a flowing current of hot sulfuric acid therein and passes forward therewith, into and through the retort, giving off nitric acid vapors. These nitric acid vapors pass upward through 19 in countercurrent to the hot sulfuric acid therein and reach scrubbing tower 32, provided with any of the usual internal means for contacting vapors and liquids, wherein the nitric acid vapors are dried and, to some extent, freed of nitrous vapors by downflowing sulfuric acid, or sulfuric acid mixtures. Various acid mixtures from various sources containing sulfuric acid and, advantageously, nitric acid, may be used for dehydrating at this point. It is desirable that the acid used in scrubbing at this point be not too concentrated. It is of course convenient to use mixed acids containing both sulfuric acid and nitric acid, since the nitric acid is recovered, but sulfuric acid from any suitable source and at any suitable temperature may be used alone. The acid coming from the scrubbing tower enters the described conduit 19 to supply sulfuric acid thereto. If desired, a further portion of sulfuric acid, or mixed sulfuric and nitric acids, may be fed into the conduit through inlet 29. Weak nitric acid may also be supplied through this inlet 29, if it be desired. The acid leaving the base of this scrubbing tower is of course hot and enters the conduit (19) in a heated state. Nitric acid and vapors of nitrogen oxids leave the drying scrubber by 34 leading to a vapor main 34$^a$, whence they pass by vapor pipe 34$^b$ into bleacher 35, wherein they pass upward against liquid nitric acid flowing downward therein and coming from the condensing apparatus. There may be several of these bleachers drawing vapors from one main. In order to prevent liquid condensing in the main reaching the bottom of the bleachers, a valved liquid by-pass 35$^a$ is provided, whereby such liquid may be sent into the top of one of the bleachers. The bleacher delivers acid of any desired strength from, say, 60 to 98 per cent, or stronger. Acid is withdrawn at 36. Uncondensed nitric acid and nitrous vapors pass through pipe 37 to acid vapor main 38, whence they pass to one or more condensers of any suitable or standard type. As shown, the vapors pass in a more or less circuitous manner by means of upright conduits 39 connected by cross tubes 40 (cooled by flowing water from 43) to vapor outlet 41, communicating with main 42 leading to absorption towers (not shown) adapted to reoxidize and recover such nitrous oxids as nitric acid. The nitrous vapors are customarily recovered in the absorption towers as nitric acid of about 68 to 75 per cent. strength. About 1 part of this 68 to 75 per cent. acid in admixture with 10.5 parts of about 100 per cent. sulfuric acid will give a suitable acid for feeding into 32.

It will be noted that dehydrating tower 32 when used with mixed acids containing nitric acid is really a denitrating tower as well. In other words, it is a dehydrating tower, a denitrating tower and a heat exchanger. The sulfuric acid used in the present invention has a double function in the course of its flow through the system; being a dehydrating and denitrating agent as it flows through 32 and an acid expelling agent in its flow through 1. Conditions in 32 are best so arranged that the flow of acid coming from 33 while sufficient to meet the needs of 32 is also just sufficient for the needs of 1. Its functions in denitrating may be used with all sorts of mixed acids. The nitric acid concentrated in this tower need not originate in the process itself but may come from other sources. For example, spent acids coming from the nitration of cotton or from the manufacture of other nitro products and containing both nitric and sulfuric acids may be treated in this tower. Weak nitric acid from any source may be fed either into the scrubbing tower 32 through 33, or into the mixing conduit 19 through one or more inlets 29.

In the use of the described apparatus, all the water in the system, except for the amount going forward with the strong nitric acid vapors beyond scrubber 32, ultimately finds exit with the sulfates at the other end of the retort. These sulfates, although fused, invariably contain some water. The water entering with the mixed acids when these are used in scrubbing, except for such as goes forward with the nitric acid vapors, ultimately also passes to exit with the sulfates. The sulfuric acid supplied to the tower 32 absorbs and carries forward water in an amount depending on various factors, such as the temperature of the niter cake or sulfates leaving the lower end of the retort, the moisture in the nitrates entering the system and the moisture of the air entering the system, the amount of decomposition of $HNO_3$ into water, oxygen and nitrous oxids, and the effective strength of the sulfuric acid in the acid mixture entering through 33. Any of these factors may be varied between limits determined in operation to be good practice. The temperature of the scrubber may be controlled by the temperature of the scrubbing acid employed. The scrubber may be provided with positive temperature controlling means of usual types and may be lagged with heat insulating materials, as may other elements shown.

The sulfuric acid coming through the scrubber 32 absorbs enough water and nitrous oxids to restrain materially decomposition of nitric acid in the retort.

While the present process and apparatus may be used for the production of other acid vapors, such as HCl, we regard our invention as primarily adapted for the continuous production of nitric acid.

In order to conserve heat in bleaching tower 35, it is advisable to lag it as shown at 44. Steam coils 45 may be provided for heating the bleaching tower when desired. It is often desirable to lag conduit 19 with magnesia or other heat insulating material. It is also desirable to lag, similarly the exposed ends of the retort.

The fused sulfates received at the lower end of the retort may be used for any purpose for which they are suitable. Where the discharge is of a fairly acid nature, that is, in a state analogous to that of ordinary niter cake, it may be used for evolving nitric acid or hydrochloric acid in another like apparatus; that is in a rotating externally heated drum. In so doing, however, it is not necessary to rib the interior of the drum or retort.

What we claim is:

1. In the continuous manufacture of nitric acid, the process which comprises establishing and maintaining a flow of hot sulfuric acid gradually merging into a flow of molten sulfates, distributing alkali metal nitrate on the surface of the sulfuric acid at a mid point in the flow of said sulfuric acid and withdrawing nitric acid vapors at a point nearer the origin of the acid flow.

2. In the continuous manufacture of nitric acid, the process which comprises passing an acid liquid comprising sulfuric acid in countercurrent against hot nitric acid vapors thereby heating the same, dropping alkali metal nitrate into the flow of heated acid and heating the flowing mixture of acid and nitrate until it is converted into molten alkali metal sulfates while passing evolved nitric acid vapors backward along the line of flow into contact with the initially used liquid comprising sulfuric acid.

3. In the continuous manufacture of nitric acid, the process which comprises establishing and maintaining a flow of hot sulfuric acid gradually merging into a flow of molten sulfates, dropping portions of preheated nitrate into said flow and conducting the vapors of nitric acid evolved in the flow backward along such flow past the point of introduction of nitrate, the hot vapors being subsequently contacted in countercurrent with an acid liquid comprising sulfuric acid to furnish hot sulfuric acid for said flow and produce concentrated nitric acid vapors.

4. In the continuous manufacture of nitric acid, the process which comprises establishing a flow of hot sulfuric acid through a conduit to a suitable distilling apparatus and dropping segregated particles of alkali metal nitrate into such flow in such manner as to develop a cushioning outflow of nitric acid vapors from such particles, thereby maintaining their mutual segregation.

5. In the manufacture and concentration of nitric acid the process which comprises evolving hot nitric acid vapors from a mixture of alkali metal nitrate and sulfuric acid in a suitable apparatus, passing said vapors in countercurrent to a flow of liquid comprising sulfuric acid and also nitric acid to be strengthened, thereby volatilizing said nitric acid and heating said sulfuric acid and leading the sulfuric acid thereby heated into contact with nitrate for evolving nitric acid vapors.

6. In the continuous manufacture of nitric acid, the process which comprises bringing together preheated alkali metal nitrate with preheated sulfuric acid as a flowing current, heating the nitrate and sulfuric acid as a flowing body until molten sulfates are produced and discharging said sulfates; nitric acid vapors produced in the heating being passed backward along the line of flow and past the point of entry of nitrate, hot vapors passing such point being thereafter contacted in countercurrent with a flow of sulfuric acid admixed with nitric acid, said nitric acid vapors, after said contact, being passed in countercurrent with a flow of condensed nitric acid to produce concentrated and bleached nitric acid.

7. In the continuous manufacture of nitric acid, the process which comprises bringing together preheated alkali metal nitrate with preheated sulfuric acid as a flowing current, heating the nitrate and sulfuric acid as a flowing body until molten sulfates are produced and discharging said sulfates; nitric acid vapors produced in the heating being passed backward along the line of flow and past the point of entry of nitrate, hot vapors passing such point being thereafter contacted in countercurrent with a flow of sulfuric acid admixed with nitric acid, said nitric acid vapors, after said contact, being passed in countercurrent with a flow of condensed nitric acid to produce a concentrated and bleached nitric acid, uncondensed nitric acid being thereafter condensed by cooling to furnish the flow of nitric acid.

8. An apparatus for producing volatile acids with the aid of sulfuric acid, comprising a rotatable retort provided with an internal helical rib, means for heating the retort, means at one end for removing fused sulfates, means at the other end for introducing a flowing current of preheated sulfuric acid and an alkali metal salt of a volatile acid, means for dropping such salt in particle form into such flow just prior to its entry into the retort, means for scrubbing evolved acid vapors in countercurrent to sulfuric acid and means for condensing acid from the scrubbed vapors.

9. In a nitric acid plant, a fire chamber, a rotating retort mounted on and approximately closing the top of said fire chamber, means for supplying nitrate and sulfuric acid thereto, means for removing products of reaction therefrom, dampered means for removing products of combustion from said fire chamber, a hot chamber mounted on the fire chamber and surrounding the rest of the retort, and dampered waste gas removing means for said hot chamber.

10. In a nitric acid plant, a long rotary inclined retort having an internal helical rib, external heating means for the retort, flanged ends on the lower end of said retort, a stationary housing having coöperating spring-pressed flanges making joint with the first mentioned flanges, a stationary closure for the other end of said retort, having a similar joint-making means, and means for supplying a mixture of sulfuric acid and nitrate into said retort, and means for removing nitric acid therefrom.

11. In a nitric acid making plant, the combination of an inclined retort having an internal helical rib and having means at one end for discharging molten sulfates and at the other for feeding sulfuric acid and nitrate, a fire chamber heating the bottom of said retort, a hot chamber inclosing the rest of said retort, means for heating and drying alkali metal nitrate with the aid of waste gases from said fire chamber and means for dropping dried and heated nitrate into acid flowing into said retort.

12. In the continuous manufacture of nitric acid the process which comprises establishing and maintaining a flow of hot sulfuric acid gradually merging into molten sulfates, dropping alkali metal nitrate into the acid flow to flow forward therewith and removing the nitric acid vapors produced.

In testimony whereof we affix our signatures hereto.

NORMAN C. HILL.
HARRY L. MOYLER.